United States Patent [19]
Dang et al.

[11] Patent Number: 5,754,518
[45] Date of Patent: May 19, 1998

[54] PLUGABLE MEDIA STACKLOADER FOR PERSONAL COMPUTER

[75] Inventors: Chi-Hung Dang; Kamal Emile Dimitri; John Edward Kulakowski; Rodney Jerome Means, all of Tucson, Ariz.

[73] Assignee: International Business Machines Corporation, Armonk, N.Y.

[21] Appl. No.: 716,798

[22] Filed: Sep. 16, 1996

Related U.S. Application Data

[63] Continuation of Ser. No. 340,517, Nov. 16, 1994, abandoned.

[51] Int. Cl.$^6$ .............................. G11B 17/22; G11B 17/04
[52] U.S. Cl. ................................. 369/191; 369/36
[58] Field of Search ..................... 360/92; 369/36, 369/191

[56] References Cited

U.S. PATENT DOCUMENTS

| | | | |
|---|---|---|---|
| 4,878,137 | 10/1989 | Yamashita et al. | 369/36 |
| 5,014,255 | 5/1991 | Wanger et al. | 369/36 |
| 5,089,920 | 2/1992 | Bryer et al. | 360/92 |
| 5,123,000 | 6/1992 | Fitzgerald et al. | 369/36 |
| 5,153,862 | 10/1992 | Taylor et al. | 369/36 |
| 5,182,686 | 1/1993 | Lindenmeyer | 360/92 |
| 5,264,974 | 11/1993 | Campbell et al. | 360/92 |

FOREIGN PATENT DOCUMENTS

| | | |
|---|---|---|
| 55-122263 | 9/1980 | Japan . |
| 3-224168 | 10/1991 | Japan . |
| WO 91/04930 | 4/1991 | WIPO . |

*Primary Examiner*—Stuart S. Levy
*Assistant Examiner*—David D. Davis
*Attorney, Agent, or Firm*—Baker, Maxham, Jester & Meador

[57] ABSTRACT

A media stackloader for processing media in one or more drives of a personal computer is provided where the stackloader plugs into a half slot or full slot (5¼) inch of the personal computer. The stackloader has a plug portion which is integral with a housing portion, the plug portion plugging into the slot and the housing portion housing a magazine which contains media, such as optical disk cartridges. The stackloader is provided with a device for moving the magazine vertically within the housing to align selected cartridges with an opening in one of the drives of the personal computer. After the cartridge is aligned, a device is employed for moving the cartridge horizontally into the drive for processing and, after processing, for withdrawing the cartridge from the drive back into the magazine. A device is provided for locking and unlocking the cartridges, the operator unlocking the cartridges when it is desired to remove from or add cartridges to the magazine. In the preferred embodiment the stackloader receives its power from the personal computer and employs an autochanger controller which is connected to a microprocessor on the mother board of the personal computer via a SCSI interface. The autochanger controller operates the devices for vertically moving the magazine and horizontally moving the cartridges as well as operating sensing and indicating functions. The stackloader enables a small user to operate a mini-library of cartridges in a standard home type personal computer.

72 Claims, 10 Drawing Sheets

PLUGABLE MEDIA STACKLOADER FOR PERSONAL COMPUTER

BACKGROUND OF THE INVENTION

This application is a continuation of application Ser. No. 08/340,517, filed Nov. 16, 1994, now abandoned.

1. Field of the Invention

The present invention relates to a plugable media stackloader and more particularly to an apparatus which can be plugged into a slot of a personal computer for processing media in a drive within another slot of the personal computer.

2. Description of the Related Art

To store large amounts of data under conditions guaranteeing automatic, reasonably speedy access to data storage media, media libraries have been developed. These libraries store the media in magazines and employ transport mechanisms to move media instances between magazines and media drives.

Magazines containing media, such as cartridges which contain optical or magnetic disks, are presently processed by large and complex transport systems. An operator inserts a magazine into a receptacle which positions cartridges in the magazine for processing. A picker transports a selected cartridge from the magazine to a drive where a disk contained in the cartridge is processed by writing and reading data on the disk. After processing, the cartridge is transported to the magazine and the picker stands ready to transport another cartridge. The picker for such a transport system is somewhat complex. The picker grabs and withdraws the cartridge from the magazine in an X direction, transports it in a Z direction and inserts the cartridge in the drive in the X direction. Normally the picker includes a receptacle through which the cartridge is translated between the magazine and the drive without any flipping of the cartridge.

There has been a long standing and strong felt need in small, low-end computer systems for a media storage and transport system that provides a magazine mounted library capability without requiring additional drive or a standalone library. What has been described hereinabove is a large system employed by companies or other entities which have a large volume of data to be processed. Such a system is too large and too expensive for a small system which processes data on a personal computer. It is obvious that the scheme of the large system is not applicable for processing magazine mounted media by a personal computer. To be compatible with a personal computer the apparatus must be small, easy to use and low in cost.

In small computer systems, stackloaders have been developed to provide library-like services for media such as tape or floppy disks. Stackloaders typically store a plurality of medium instances (such as tape cassettes) in a vertical array (a "stack") by means of a frame, which may be plugged into a medium drive receptacle. A transport mechanism selects a medium instance, extracts it from the stack, loads it into the drive, and later extracts it from the drive and returns it to the stack.

To date, stackloaders for small computer systems have been particularly adapted for a single use. Relatedly, no stackloader is known which can either plug into a drive receptacle or operate on a standalone basis. Further, the existing stackloaders are not capable of accessing medium instances in adjacent receptacles. Last, known stackloaders are designed for use with particular medium configurations and cannot adapt to the different distances and dimensions of other configurations. Thus, there is a manifest need for a stackloader that can interface with a small computer system by anchoring in a drive receptacle, yet which can store medium instances and operate outside of the drive receptacle and access medium instances in adjacent drive receptacles. The need also embraces the as-yet unsatisfied requirement that the stackloader be adaptively reconfigurable to the dimensions and distances of different medium configurations.

SUMMARY OF THE INVENTION

The present invention provides a novel transport system for processing a batch of cartridges in a drive of a personal computer. The transport system, which is referred to as a plugable stackloader (or a plugable autochanger), includes a housing for accepting a magazine of cartridges and a plug which fixedly extends from the housing. The plug plugs into a slot or half high slot in the front face of the computer with the housing positioned opposite a drive for processing the cartridges. A vertical transport device vertically positions the magazine within the housing at selected vertical positions which align a selected cartridge with the drive. When the selected cartridge is aligned, a horizontal picker device moves the cartridge into the drive for processing and returns the cartridge to the magazine after processing.

The vertical transport device and the horizontal picker device are controlled by an autochanger controller which may be located inside the plug portion of the stackloader. The autochanger controller is connected to a mother board in the personal computer via a small computer system interface (SCSI). An operator can control the operation of the stackloader by sending commands to the computer via a keyboard. Selected data can be retrieved, recorded or sorted. If the plugable stackloader is not involved in an operation, an operator can add or remove cartridges from the magazine.

Provision is made for indicating the type of magazine and media, whether the magazine is at a home position and whether a cartridge is in the drive. The vertical movement device and the horizontal movement device employ incremental movements which can be counted to various levels so that the stackloader can be adapted to process various types of media. In a preferred embodiment, the drive receives a major portion of the cartridge while a small portion of the cartridges remains outside the drive in engagement with the horizontal picker device. This arrangement enables a very simple horizontal picker device. A major difference between the present invention and large magazine transport systems is that in the present invention the magazine is transported vertically.

An object of the present invention is to provide a stackloader for a personal computer which is small, easy to operate and low in cost.

Another object is to provide a transport system which is compatible with a personal computer for processing selected magazine mounted cartridges.

A further object is to provide a stackloader for a small computer which has flexibility of handing different sizes of media and magazines.

Yet another object is to provide a stackloader which can be installed on and removed from a personal computer with minimal effort.

Still another object is to provide a stackloader which will operate with a personal computer through a normal SCSI interface in the computer.

Other objects, advantages and features of the invention will be readily apparent after reviewing the following specification, claims and accompanying drawings.

DESCRIPTION OF THE PREFERRED EMBODIMENTS

Figure 1:
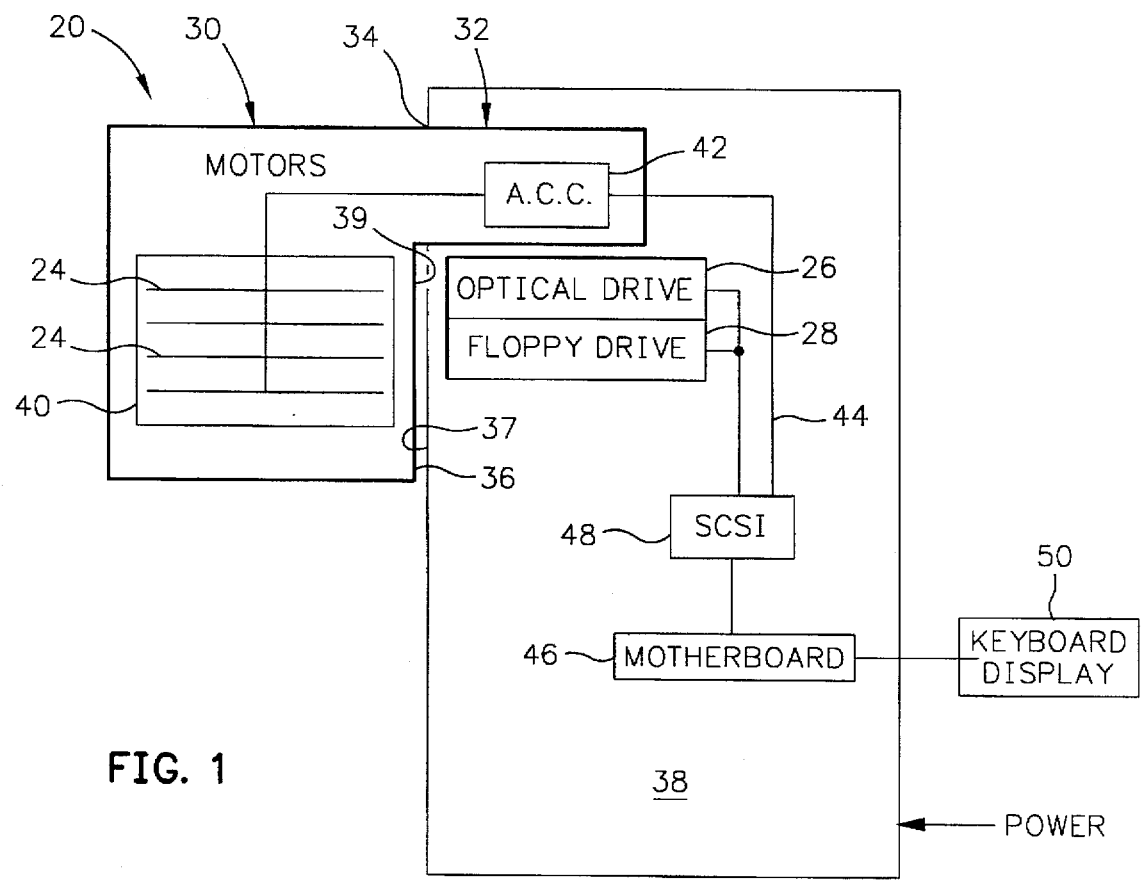
FIG. 1 is a side elevational schematic illustration of the plugable stackloader plugged into a personal computer.

Referring now to the drawings wherein like reference numerals designate like or similar parts throughout the several views, there is illustrated in FIG. 1 a stackloader 20 which is plugged into a host computer 38 for processing media 24 in a drive, such as an optical drive 26 or a floppy drive 28. The stackloader includes a housing 30 and a plug 32, the plug 32 being fixedly attached to the housing 30 and co-extensive along its sides and top with the housing which will be clear from the drawings described hereinafter. The plug 32 is snugly received by a slot, such a 5¼ inch slot 34 of the computer so that a front face 36 of the housing is facing and adjacent a front face 37 of the computer 38 the front face 36 being open to provide a transport opening 39 for the media 24.

The media 24, which will be referred to hereinafter as cartridges, are mounted in receptacles in a magazine 40 so that a cartridge can slide from the magazine into a drive when the cartridge is aligned therewith. Provision is made for vertically moving the magazine 40 for aligning a selected cartridge with a drive and provision is made for horizontally moving the aligned cartridge into and out of the drive for processing which will be explained in more detail hereinafter. The purpose of the invention is to process a mini-library of cartridges with a typical personal computer upon command.

An autochanger controller (ACC) 42 is located inside the plug 32 and is connected by a cable 44 to a mother board 46 via a small computer system interface (SCSI) 48. The details of these components will be described in more detail hereinafter. A keyboard display 50, which is connected to the mother board 46, is employed by an operator to send commands via the computer mother board 46, the SCSI interface 48 and the autochanger 32 to the devices for vertically moving the magazine 40 and horizontally moving the cartridges 24. The SCSI interface is a common circuit board within most personal computers and the autochanger controller 42 is a standard microprocessor for media libraries. The SCSI interface 48 and the autochanger controller 42 employ the ANSI command set for media libraries.

Figure 2:
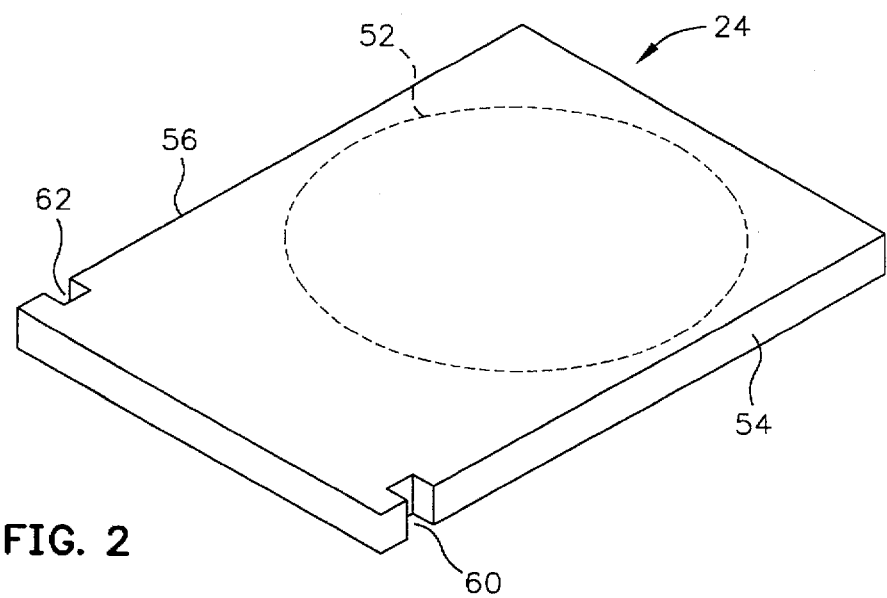
FIG. 2 is a schematic illustration of a cartridge which has a pair of notches.

FIG. 2 is a schematic illustration of a preferred cartridge 24 for containing a medium such as an optical disk 52. The cartridge has a pair of parallel side edges 54 and 56 which have oppositely located notches 60 and 62, respectively. While the invention is primarily described for optical disks, it should be understood that the invention could be employed for magnetic media.

Figure 3:
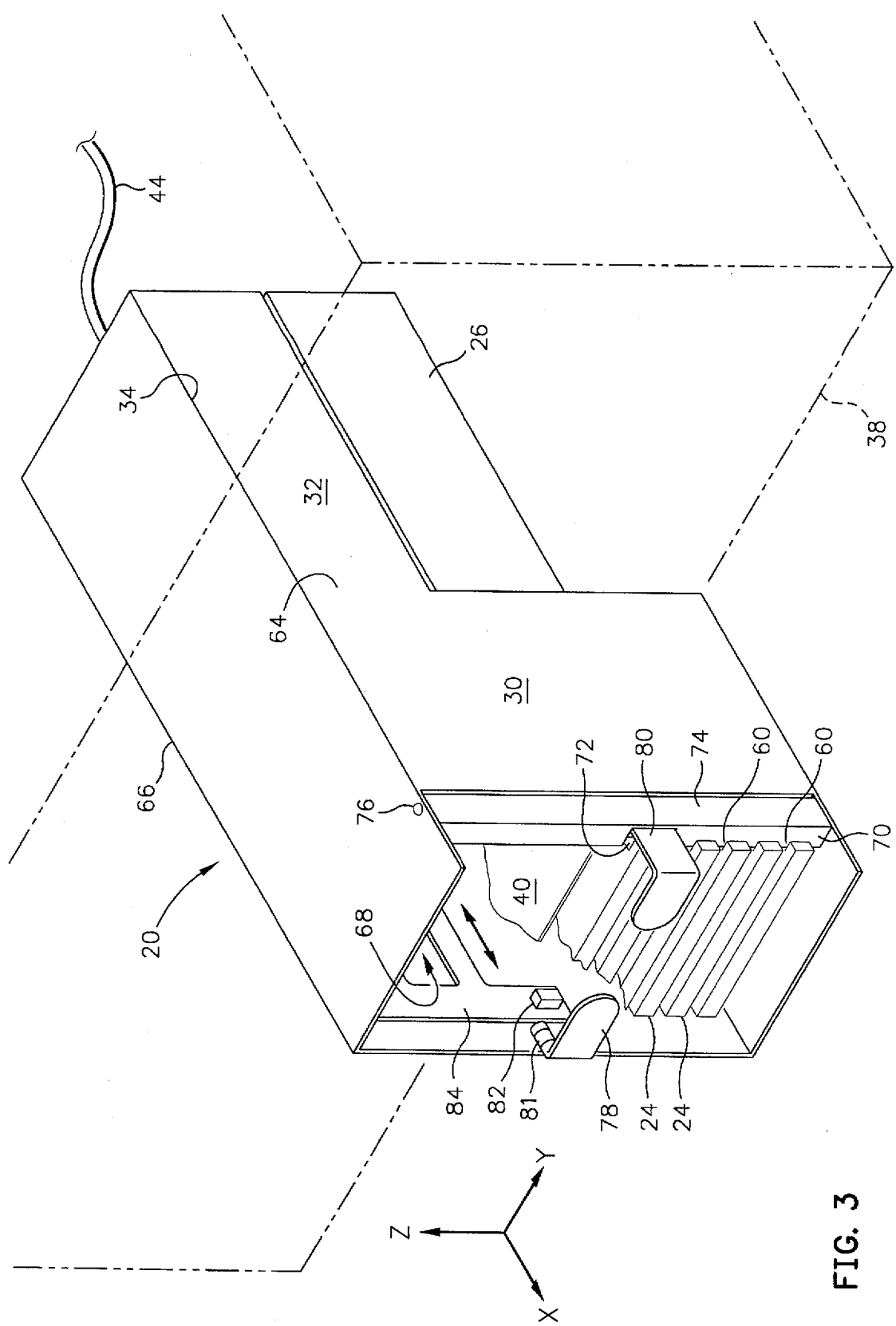
FIG. 3 is an isometric view of the plugable stackloader plugged into a personal computer with a cartridge locking device shown in the locked position.
Figure 4:
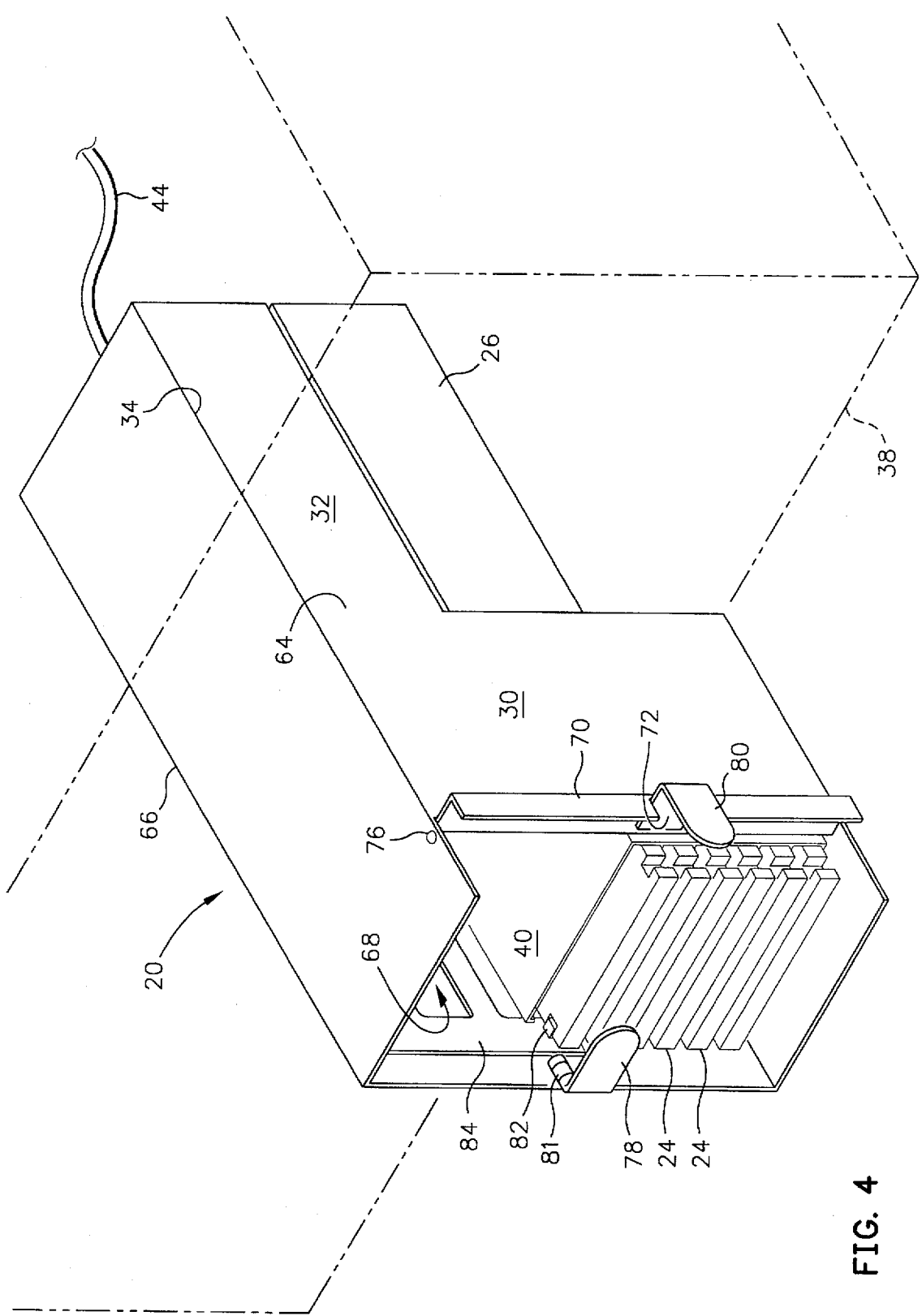
FIG. 4 is the same as FIG. 3 except the cartridge locking device is shown in an unlocked position.

In FIG. 3 the plug 32 of the stackloader 20 is shown plugged into the slot 34 of the computer as described hereinabove. The stackloader 20 has right and left cover plates 64 and 66 which cover support plates, to be described hereinafter, and which provide right and left vertical sides of the housing 30 and the plug 32. A rear portion of the magazine 40 and rear portions of the cartridges 24 are seen adjacent a rear opening 68 of the stackloader housing. The right and left notches 60 and 62 of the cartridges are vertically aligned on right and left sides, respectively, of the housing 30. A rail 70 is received by the right notches 60 for locking the cartridges from horizontal movement along an x-axis as the magazine is moved vertically along a z-axis. There is one exception to this locking function. The rail 70 is provided with a notch 72 which is aligned with an opening in the drive 26 so that when the magazine 40 is vertically positioned to align a selected cartridge with the opening of the drive the cartridge can be moved horizontally into the drive for processing. In order to unlock the cartridges for removal and replacement, the rail 70 is made integral with a flange 74, which is pivoted to the housing at 76, for allowing the rail 70 to swing outwardly from the notches as illustrated in FIG. 4.

Right and left transversely extending tabs 78 and 80 are also aligned with the opening in the drive to prevent an operator from inserting a cartridge into an empty receptacle which is reserved for a cartridge which is being processed in the drive. The operator can remove and replace cartridges in receptacles of the magazine either above or below these tabs 78 and 80. The tab 78 may be pivoted at 81 and the tab 80 may be connected to the rail 70 so that they can be swung out of the way making a passageway for inserting and removing magazines from the housing. With the magazine removed the operator can put a cartridge directly into a drive or take a cartridge out of a drive.

A portion of the magazine and cartridges are cut away in FIG. 3 to show a detent 82 which is received in the vertical column of left notches 62 of the cartridges as the cartridges move up and down within the magazine 40. The detent 82 is horizontally aligned with an opening in the drive 26 so that when a selected cartridge is aligned with the opening in the drive, the detent can be moved horizontally for moving the cartridge into the drive 26 for processing. The detent 82 is connected to a horizontal movement device, a portion of which is shown at 84 and which will be described in more detail hereinafter.

Figure 5:
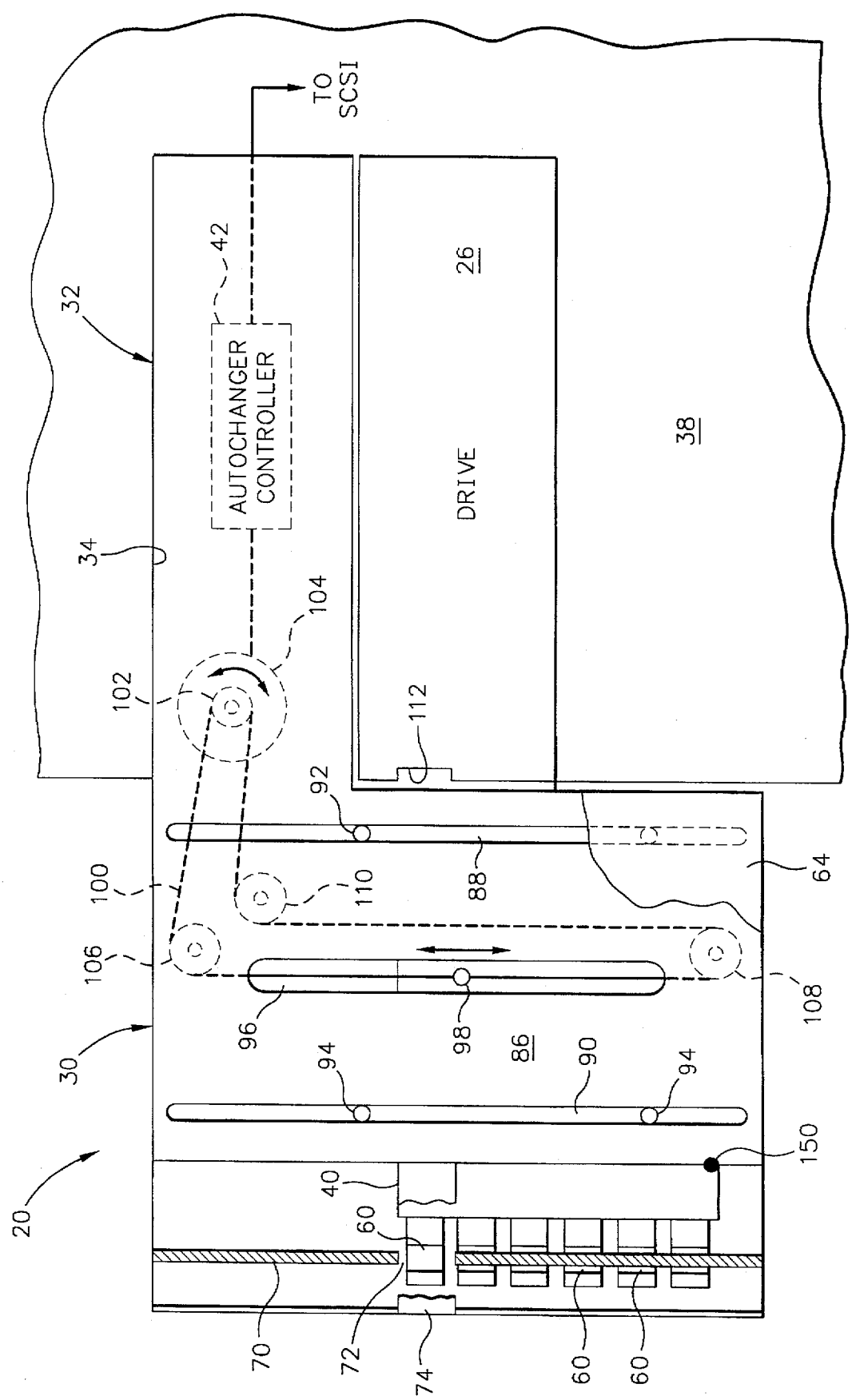
FIG. 5 is a side elevational schematic illustration of a first side of the plugable stackloader plugged in a personal computer with a side cover removed.

FIG. 5 shows a right side of the stackloader with the plug 32 plugged into the slot 34 of the computer with a majority of the right cover plate removed except for a small portion shown at 64. A right support plate 86 is vertically mounted in the housing 30 and the plug 32 for supporting components which move the magazine 40 vertically within the housing 30. The support plate 86 has front and rear vertical slots 88 and 90 which are parallel with respect to one another. Mounted on the magazine 40 or a tray (not shown) for supporting the magazine are front and rear sets of rollers 92 and 94 which ride up and down in the vertical slots 88 and 90, respectively, as the magazine 40 is moved up and down by a vertical movement device to be described in detail hereinafter. The support plate 86 has an intermediate vertical slot 96 between the vertical slots 88 and 90. A pin 98 is fixed to a belt 100 which connects the pin 98 to a pulley 102 of an incremental motor 104 via top and bottom pulleys 106 and 108, which align the belt along the slot 96, and an intermediate pulley 110 which returns the belt to the pulley 102. The pulleys 106, 108, and 110 and the motor 104 are mounted to the support plate 86. The motor 104 is operatably connected to the autochanger controller 42 and is controlled thereby which will be described in more detail hereinafter. FIG. 5 also illustrates the rail 70 recessed in the vertical column of notches 60, the notch 72 which is aligned with an opening 112 in the drive 26, and the right tab 74 which is also aligned with the opening 112 of the drive.

Figure 6:
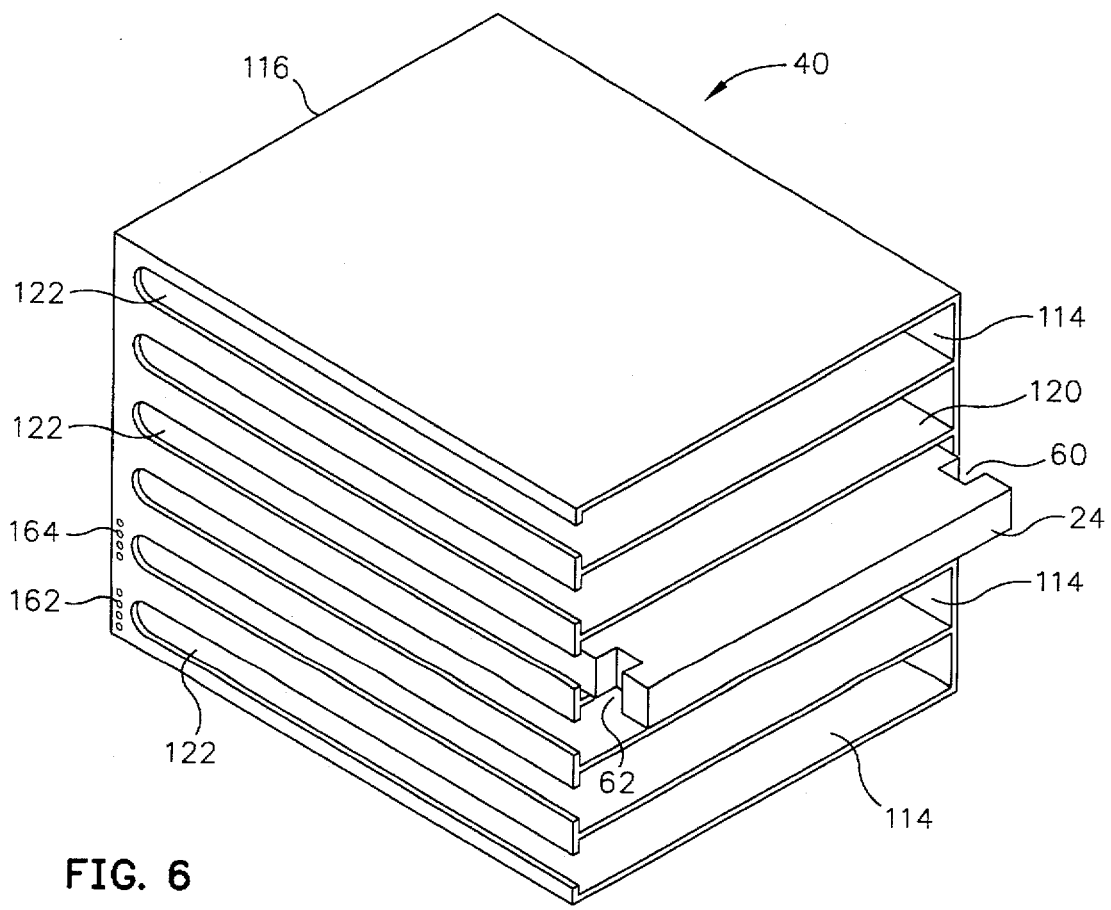
FIG. 6 is a second side view of the magazine out of the housing of the stackloader with one cartridge shown in place.

FIG. 6 is an enlarged illustration of the magazine 40 shown out of the housing of the stackloader with one disk 24 shown therein for explanatory purposes. The magazine 40 has a plurality of horizontally extending receptacles 114, each receptacle being capable of slidably supporting a respective cartridge 24. Each receptacle has front and rear open ends 116 and 120 so that an operator can insert or remove cartridges through the openings 120 and the cartridges can be inserted into the opening of the drive 26 (see FIG. 5) through the front opening 116. As can be seen from FIG. 6, the cartridge 24 extends rearwardly from the rear opening 120 so that the notches 60 and 62 can form vertical columns of notches which are exposed for processing, the right column of notches being clearly seen at 60 in FIG. 5. The right notch 60 receives the rail 70, as seen in FIG. 5, for locking purposes, as explained hereinabove, and the left notch 62 is employed with a horizontal picker device which will be explained in more detail hereinbelow. Each receptacle 114 has a respective horizontal slot 122 which is also employed by the horizontal picker device. The magazine 40 is exemplary and it should be understood that it can be configured in different sizes for different sizes of media.

Figure 7:
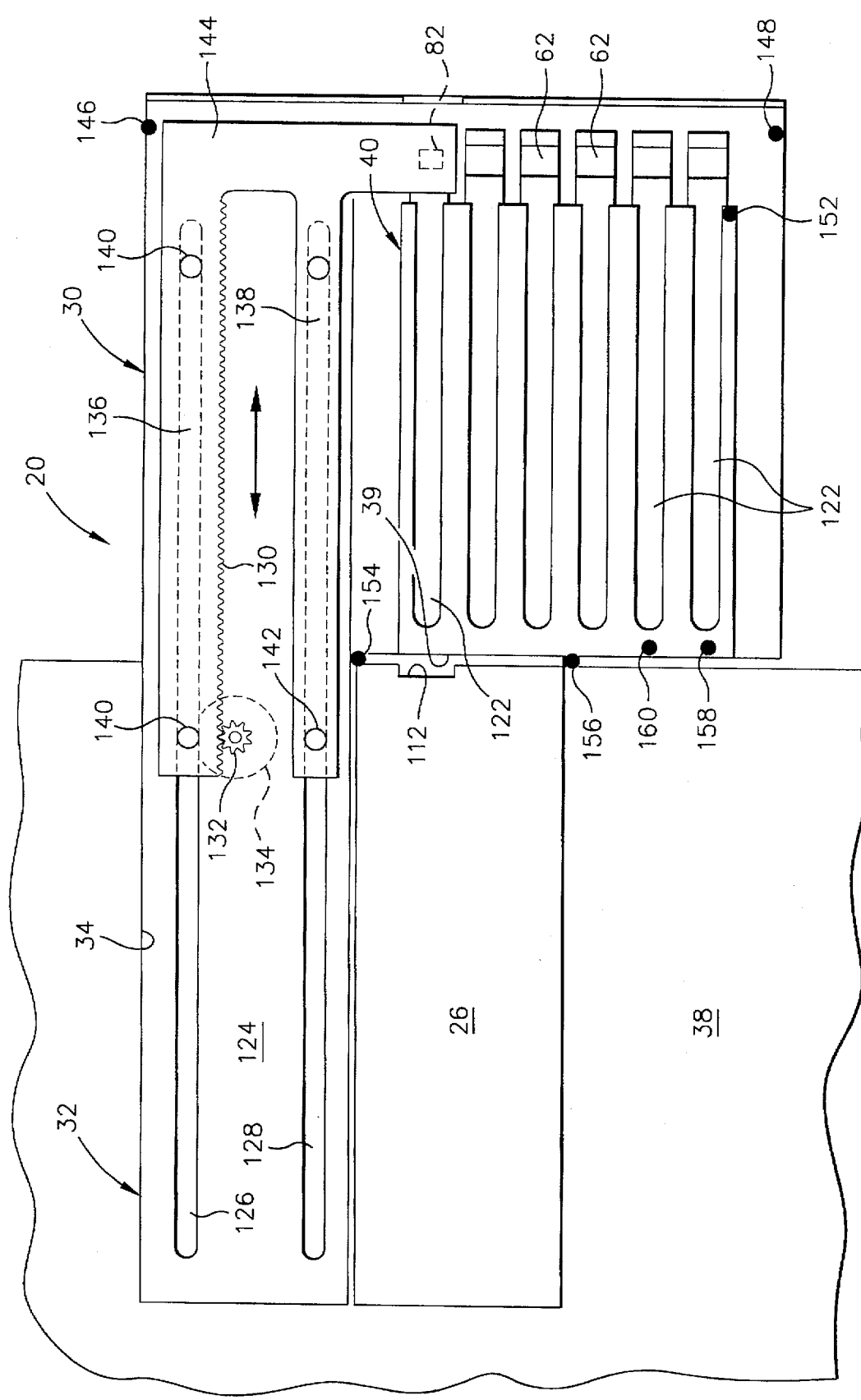
FIG. 7 is a side elevational schematic illustration of a second side of the plugable stackloader plugged into a personal computer with the side cover removed and with a horizontal cartridge moving device shown in a retracted position.

FIG. 7 is an illustration of the left side of the stackloader with the plug 32 plugged into the slot 34 of the personal computer 38. The left cover plate 66 has been removed to illustrate a left support plate 124 which supports a horizontal movement device which functions as a picker for inserting and withdrawing a cartridge with respect to the drive 26. The horizontal movement device includes the support plate 124 having a pair of horizontally extending top and bottom spaced apart slots 126 and 128 which extend in both the housing and plug regions of the stackloader. The horizontal movement device further includes a rack and pinion 130 and 132, the pinion 132 which are driven by a motor 134, the motor 134 being connected to the autochanger controller 42 to be described in more detail hereinafter. The rack may include top and bottom horizontally extending bars 136 and 138 which carry top and bottom pins 140 and 142, the pins slidably riding in the top and bottom horizontal slots 126 and 128. A vertical plate 144 interconnects the horizontal bars 136 and 138 and extends therebelow adjacent the left column of cartridge notches 62. Connected on an opposite side of the vertical plate 144 is the detent 82 (see FIG. 3) which is received by the vertical column of left notches 62 of the cartridges as the magazine 40 moves up and down within the housing 30. It should be noted once again that the detent 82 is horizontally aligned with the opening 112 of the drive 26 of the personal computer.

Figure 8:
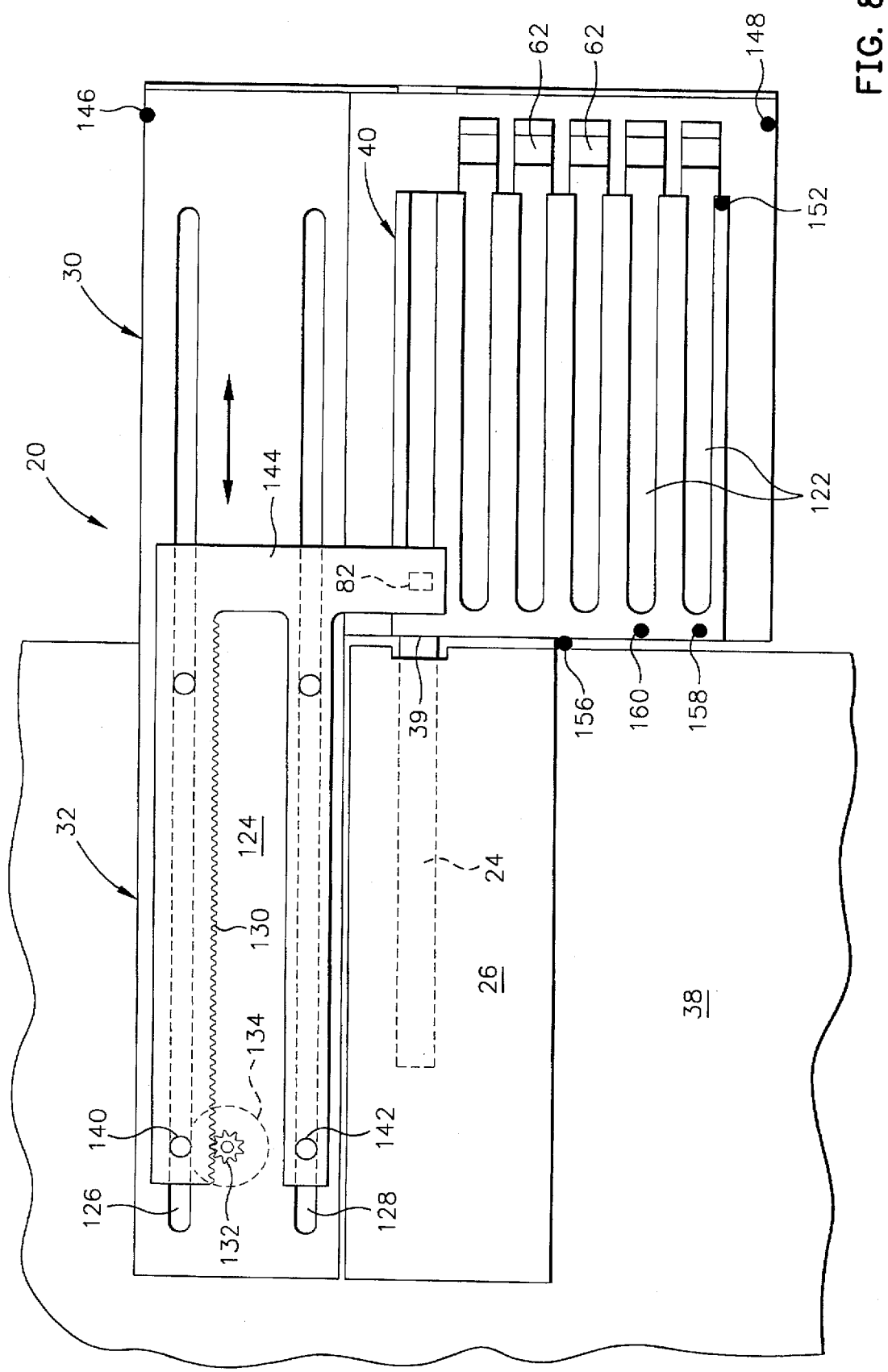
FIG. 8 is the same as FIG. 7 except the horizontal cartridge moving device is shown in an extended position.

In FIG. 7 a top cartridge in the magazine is shown in a retracted position with respect to the drive 26. In FIG. 8 the top cartridge is shown horizontally moved through the transport opening 39 in the housing 30 into the drive 26 for processing purposes. The horizontal movement has been implemented by the motor 134 and its pinion 132 which advances the rack 130 forwardly. This causes the detent 82 to advance the top cartridge forwardly into the drive, the detent riding within the top slot 122 of the magazine 40. The reverse process takes place to return the cartridge to its retracted position within the magazine, whereupon the magazine can be moved vertically again to align another selected cartridge with the opening 112 of the drive for processing.

Shown schematically in FIGS. 7, 8 and 5 are dots which represent various sensors for sensing the operational status of the stackloader. Infrared emitters and sensors can be employed to sense various conditions. For instance, an emitter 146 and a sensor 148 in the way of the vertical plate 144 of the horizontal movement device sense the Horizontal Home Position of a vertical plate 144. An emitter 150 (see FIG. 5) and a sensor 152 (see FIGS. 7 and 8) in the way of the bottom of the magazine 40 sense the bottom or Vertical Home Position of the magazine 40. An emitter 154 and a sensor 156 (see Fig. 7) in the way of the processing path of a cartridge will detect that a cartridge is in this path and prevents the vertical movement of the magazine. Sensor 158 is employed for identifying the type of magazine and sensor 160 is employed for identifying the media type. Magazines can have multiple media types. These sensors sense this information from binary markings 162 and 164 on the corner of the magazine as schematically illustrated in FIG. 6. All of these sensors and emitters can be mounted on the innersides of the coverplates 64 and 66 (see FIG. 4).

Figure 9:
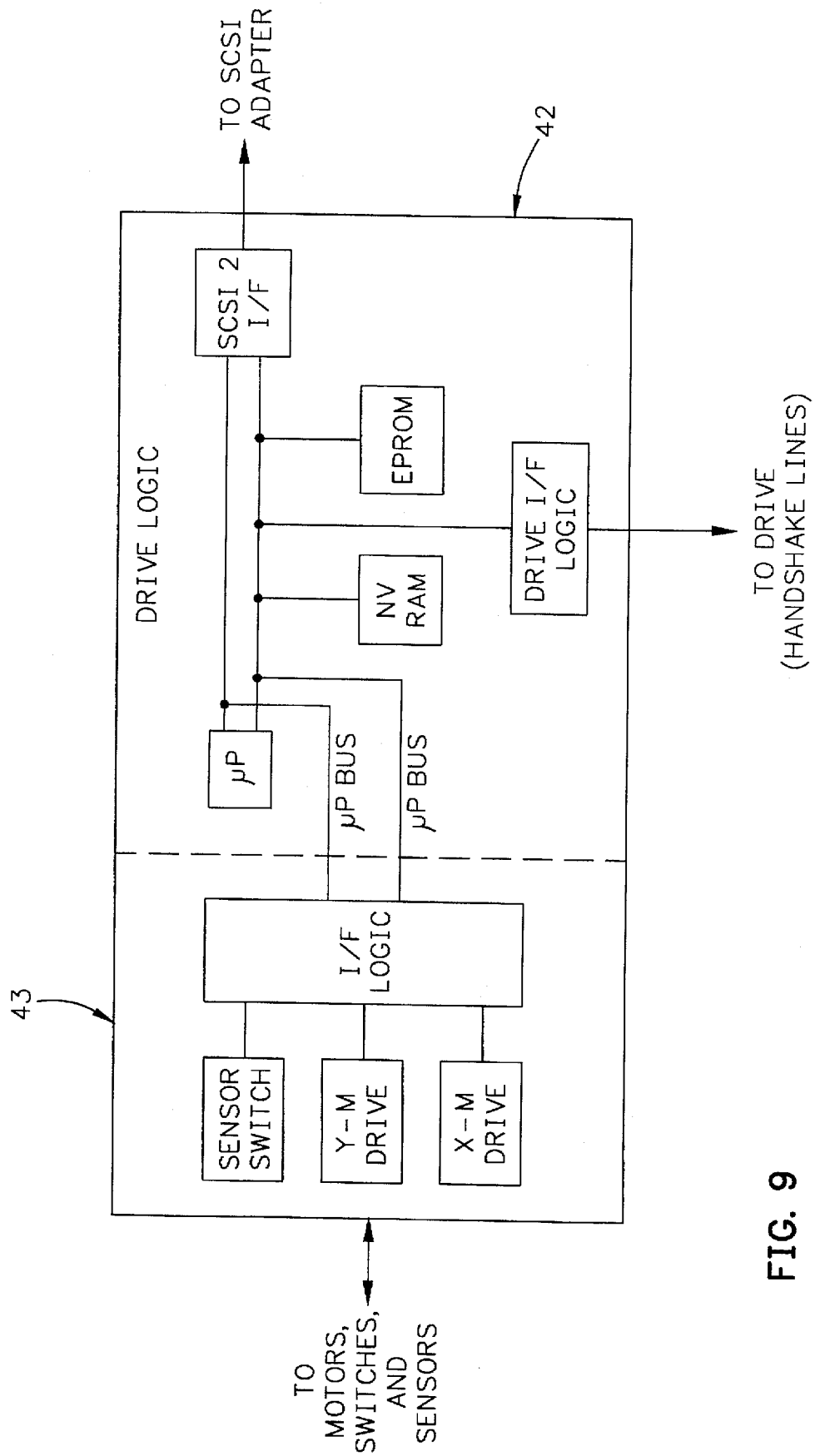
FIG. 9 is a block diagram of an autochanger controller.
Figure 10:
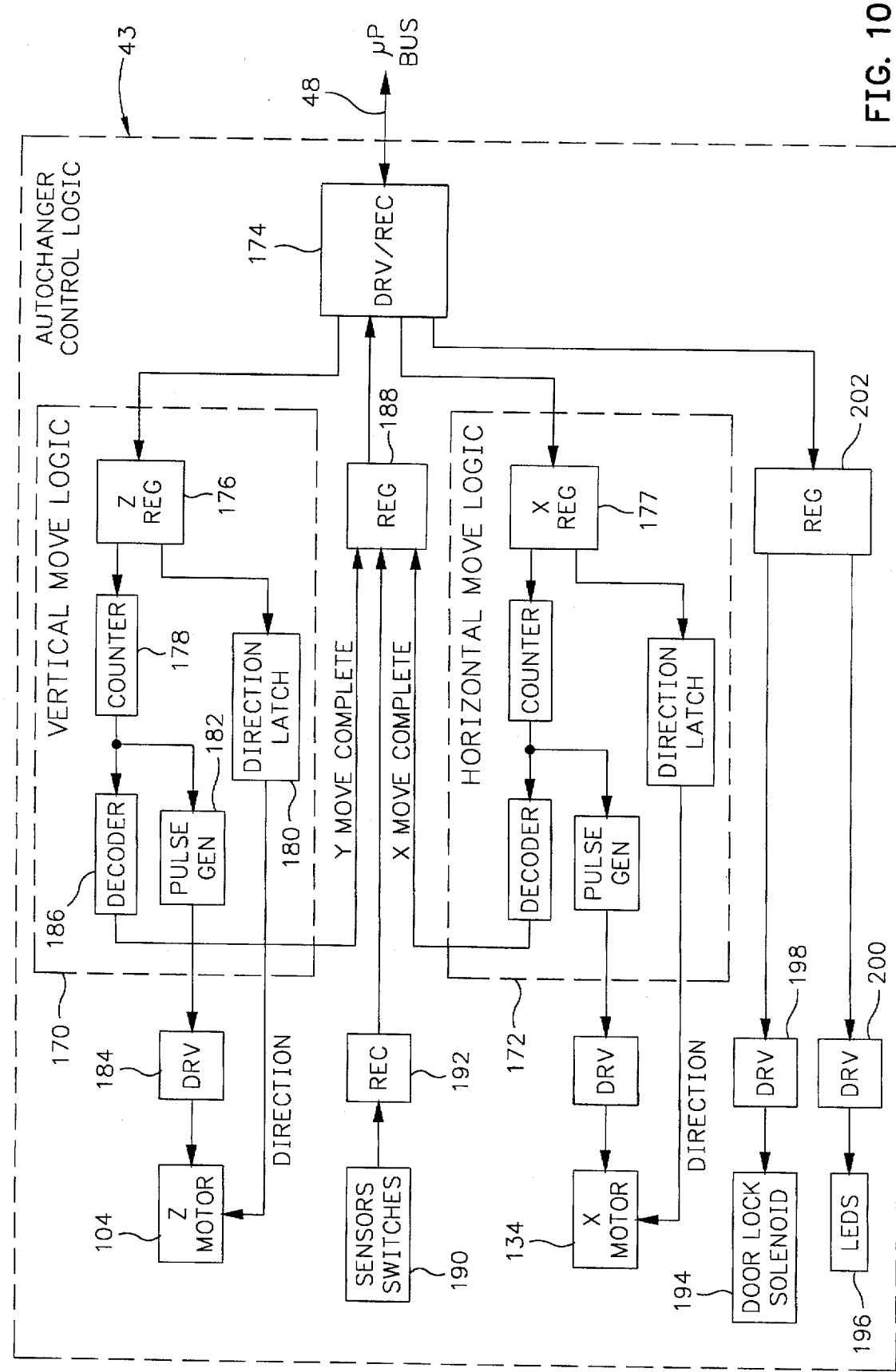
FIG. 10 is a block diagram of logic of the autochanger controller.

A block diagram for an exemplary autochanger controller 42 is illustrated in FIG. 9. It consists of a microprocessor NVRAM, EPROM, drive interface logic for handshaking, a SCSI interface and autochanger control logic 43. Details of the autochanger control logic 43 is shown in FIG. 10. Standard SCSI commands are received over the SCSI interface, stored in the NVRAM and are interpreted by the microprocessor. The program is stored in the EPROM. The microprocessor then writes control information into the Z register 176, the X register 177 and register 202 in the autochanger control logic (FIG. 10) to move cartridges to and from the drives. Sense information is determined by reading register 188.

The autochanger controller 42 is connected to the mother board 46 of the computer via the SCSI interface 48 as shown in FIG. 1. As is typical, the mother board 46 includes a microprocessor (not shown) which is coupled to the SCSI interface 48. As shown in FIG. 10, vertical move logic for the Z direction is generally shown at 170 and horizontal move logic for the X direction is generally shown at 172. Since the vertical and horizontal logic are essentially the same, the description will be directed only to the vertical move logic 170. All signals to and from the autochanger controller 42 are received through drivers and receivers 174. The microprocessor of the computer writes to a Z register 176 with a count and a direction. The count represents the extent to which the magazine is to be moved vertically within the housing of the stackloader and the direction indicates whether the magazine is to move up or down. The contents of the register 176 are transferred to a counter 178 and a direction latch 180. The counter 178 decrements and causes a pulse generator 182 to send one pulse to the Z motor 104 for each counter decrement via a driver 184. The Z motor 104 is an incremental motor which moves one increment for each count. The motor 104 moves the magazine up or down depending upon the contents of the direction latch 180. When the counter 178 reaches zero, the output of a decoder 186 is zero which indicates that the operation has been completed. This indication is transferred to a register 188. This condition, as well as all conditions of the operation of the autochanger controller 42 can be read by the mother board of the computer by polling. The microprocessor also reads the status of sensors and switches generally shown at 190 via receiver 192 and the register 188, the sensors being described hereinabove. The operation of an optional door lock solenoid 194 and light emitting diodes (LEDs) 196 are also controlled by the microprocessor via drivers 198 and 200, respectively, and via a register 202 and drivers and receivers 174.

The chart entitled "Mode Select Command for Drive/Media Characteristics", shown in Table 1 hereinbelow, explains how the stackloader can be adapted to handle different media for different drive types.

TABLE 1

"Mode Select Command for Drive/Media Characteristics"

Drive 1 Type
Loader of Drive 1 in Stepper Increments to Vertical Home Position
Drive 1 Horiz. Travel in Stepper Increments to Horizontal Home Position
Drive 2 Type
Loader of Drive 2 in Stepper Increments to Vertical Home Position
Drive 2 Horiz. Travel in Stepper Increments to Horizontal Home Position
Centerline of Media #1 to Vertical Home Position        Cell Type
Centerline of Media #2 to Vertical Home Position        Cell Type
.                                                        .
.                                                        .
.                                                        .
Centerline of Media #N to Vertical Home Position        Cell Type The stackloader uses the ANSI standard library command set. For example, a move command has a source and a destination. The source is the position of the media in the stackloader and the destination is the drive loader opening. A new mode select command would allow the microprocessor of the personal computer to set the media location, the horizontal travel, the media quantity, cell type and location of the opening to the drive with respect to the media location. This allows the stackloader to use different media types in the same magazine or different magazines in the same stackloader. It also offers the flexibility to reconfigure the stackloader to function with future drive types. Multiple magazines may be put into the stackloader. The key mechanical parameter information would be sent to the stackloader using the mode select command as shown in the above chart.

Assuming that the computer has two different drive types, such as an optical drive 26 and a floppy drive 28, as illustrated in FIG. 1, and that different cartridges are required to be moved different horizontal distances into a drive type, the microprocessor is programmed to know the number of stepper increments to move the magazine vertically and the number of stepper increments to move a cartridge horizontally for each type of drive and each type of cartridge employed in the system. Further, the microprocessor is programmed with the distance in increments from the vertical centerline of each cartridge to a reference point and the type of cartridge involved. Accordingly, the stackloader can handle all different kinds of media and drive types. The stackloader can be adapted to handle multi magazines with each magazine having the same media or multi media types.

The following mode selection commands can be employed: (1) definition of the drive and media type in the stackloader, (2) setting the increments for the stackloader media, (3) setting horizontal travel for different media types, (4) setting the media storage receptacle increments in the stackloader, (5) setting the number of media receptacles in the stackloader, and (6) locating the opening of the drive with respect to the media in the magazine. An alternative to the SCSI interface with the autochanger controller is to employ a microchannel which would send SCSI commands over the microchannel interface to operate the stackloader.

An audit command can be employed to cause the microprocessor to determine which receptacles in the magazines have media and what volumes are present. If a command is sent to the stackholder for a volume that is not present in the stackloader, a message is sent to the operator to enter the respective volume. It should be understood that the terms media and cartridges used herein are to include optical disks, floppy disks, and magnetic tape or any other removable media.

An operator can operate the system from a keyboard 50 as shown in FIG. 1. In an exemplary program the operating system of the computer would have installed the standard library support such as a standard optical disk library support which has been employed for previous optical disk libraries. The stackloader of this invention is operated by such a library support. As an example an optical disk and library device driver communicates with the drives and the library to access the media and move the cartridges. An optical disk volume and file system interfaces with the device driver to read and write directory information and data. A library inventory driver accesses the inventory information stored on the hard disk of the computer and interfaces to the library driver to cause the requested volume to be fetched and mounted in the library. The application and the operator communicates to the volumes contained in the library exclusively through this component. Optical disk drive SCSI commands and autochanger SCSI commands are fully described in a published ANSI Standard entitled "Small Computer System Interface—2, X3T9.2/86-109".

Various commands can be issued by the operator via the keyboard 50 or a console. For instance, if the operator issued the command "D:\magazine\volid\subdirectory\filename.ext" "D" is the address of the stackloader, "magazine" indicates the name and number of the magazine, "volid" indicates the name of the volume to be accessed, "subdirectory", which is optional, indicates the subdirectory on the volume where the file is located, and "filename.ext" is the filename and qualifier of the file to be accessed. When the library driver receives the command, it extracts the volid information. It searches the inventory and locates the magazine and receptacle containing the desired volid. It causes the magazine to be vertically moved and the cartridge inserted into the drive. If the desired magazine is not in the magazine, the operator is instructed to insert the desired magazine. The library driver then passes the command to the volume and file driver which establishes the directory path and locates the requested file. All subsequent reads and writes to this volid go through the library driver and through the volume and file driver to the device driver for execution by the drive. A new command with a different volid will cause the cartridge currently mounted in the drive to be demounted and returned to the proper storage receptacle in the magazine and the cartridge defined in the command to be fetched and mounted.

Additional commands may be employed by the operator to manage the stackloader. For instance, an ADD command can be employed which takes the format "ADD D:\volid:magazine,receptacle" can be employed by the operator to update the cartridge inventory after the operator has inserted a cartridge in the magazine. "D" is the address of the stackloader, "volid" is the volume, serial number, and target cartridge, "magazine" is the identification number of the target magazine and "receptacle" is the address of the target receptacle. Another command may be a REMOVE command which takes the format "REMOVE d:\volid:magazine,receptacle" and is employed by the operator to update the cartridge inventory after the operator has removed a cartridge from the magazine. Another command is an AUDIT command which takes the format "AUDIT D:" and is employed to update the inventory as to the volid residing in each receptacle of the magazine or magazines.

Figure 11:
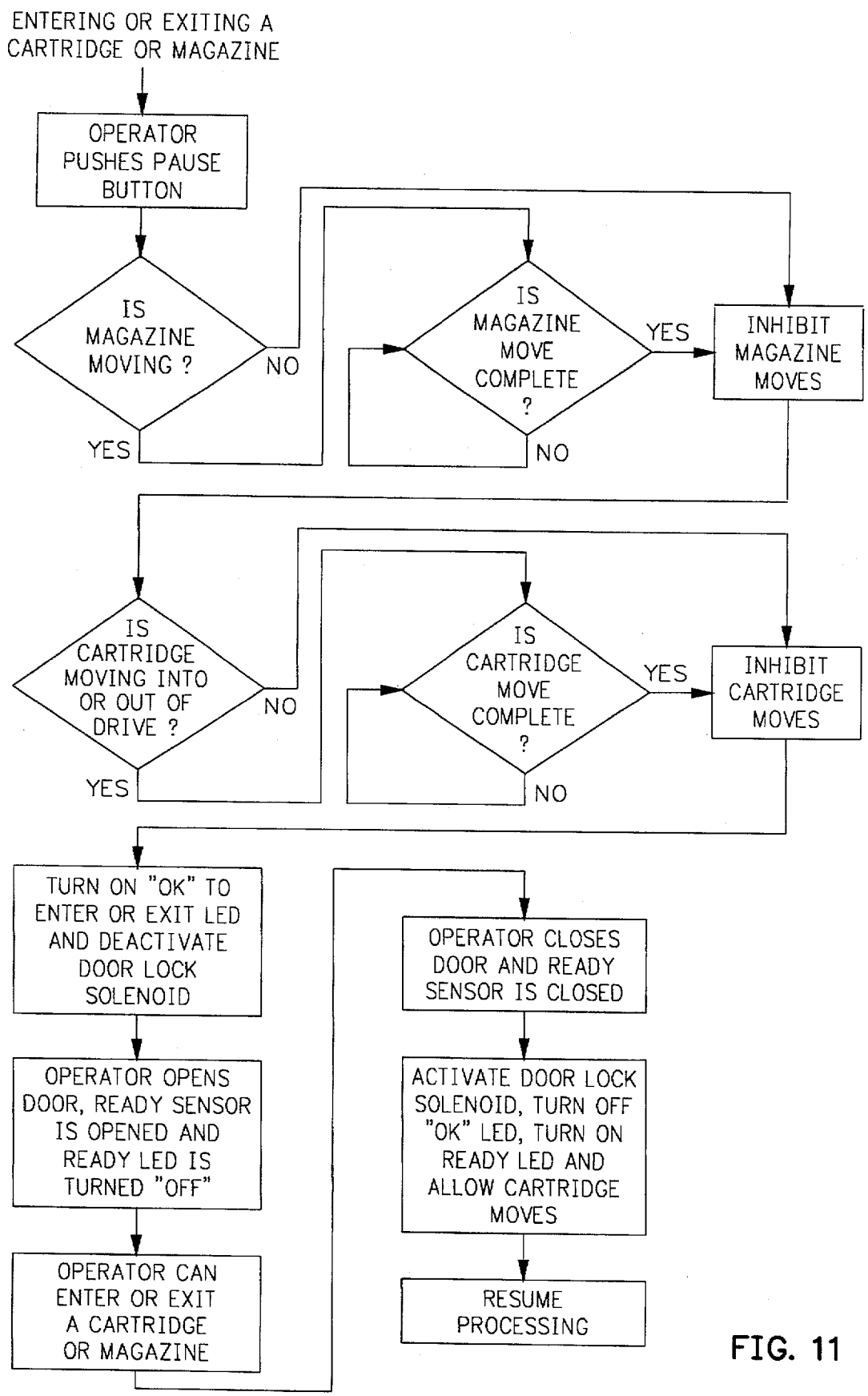
FIG. 11 is a flow diagram for entering or exiting a cartridge or magazine from the stackloader.

Switches for the stackloader include an on and off switch and a pause switch which allows the operator to stop the operation of the stackloader so that he can enter or exit a cartridge with respect to the magazine. When the stackloader is operating, a solenoid is used in conjunction with the rail 70 shown in FIG. 3 for keeping the rail in a locked position in the notches of the cartridges. Indicators for the stackloader include a power on indicator, a ready indicator indicating that the rail 70 is locked into the cartridges and that the stackloader is ready for operation, a busy indicator indicating that a cartridge is being processed, an okay indicator indicating that it is okay to enter or exit a cartridge or a magazine and a service indicator indicating that the stackloader needs service, such as that the cartridge is stuck. All of the switches, the solenoid and the indicators in conjunction with LEDs can be operated through the autochanger controller logic 43 shown in FIG. 10. An exemplary scheme for entering or exiting a cartridge or magazine from the stackloader is illustrated by the flow diagram in FIG. 11.

In the embodiment of the stackloader described hereinabove, the horizontal cartridge picker apparatus does not insert the whole cartridge into the drive, as illustrated in FIG. 8. In another embodiment of the stackloader, the horizontal picker device may be modified to push a standard cartridge completely within the drive and after processing push the standard eject button (not shown) on a personal computer to return the cartridge to the horizontal picker device. This would require a somewhat more complex horizontal picker device, and therefore, the horizontal picker apparatus described hereinabove is preferred. With the preferred picker, a portion of the cartridge is outside of the drive during processing.

What has been described is a stackloader that plugs into a full or half high 5¼ inch slot in the front of a personal computer which has one or more drives in one or more slots therebelow. A vertical moving device is employed to move a magazine up and down within the stackloader so that a cartridge can be aligned with an opening in a selected drive. A horizontal moving device moves the cartridge into and out of the drive. An autochanger controller accepts commands from the mother board of the personal computer via a SCSI interface which is standard in most personal computers. Either cartridges or magazines can be entered or removed from the stackloader. Further, commands can be made which configure the stackloader to accept various types of magazines and cartridges based upon a certain number of incremental movements horizontally and vertically. The operator can insert or remove cartridges from a magazine within the stackloader while the stackloader is not in an active status.

Figure 12:
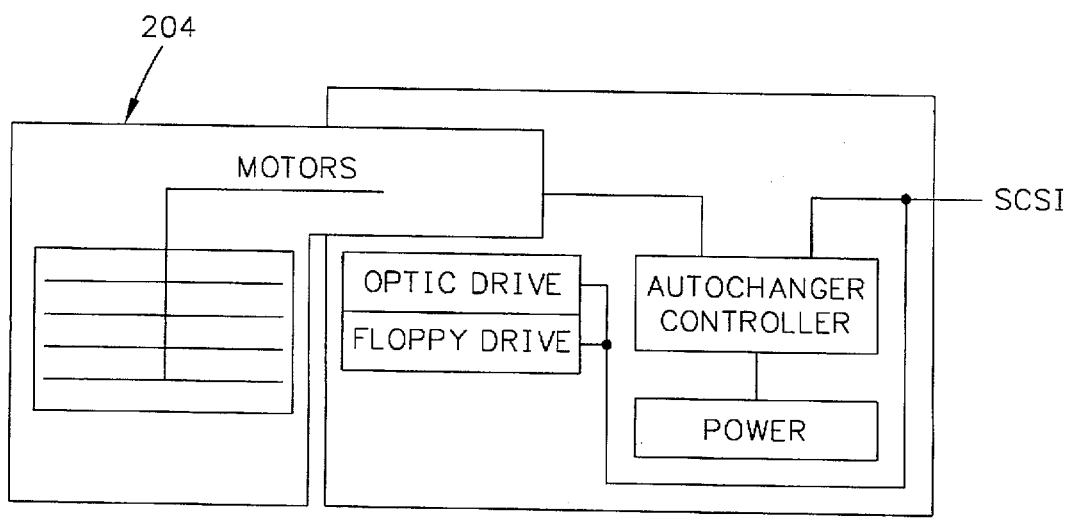
FIG. 12 is a side elevational schematic illustration of the plugable stackloader in a standalone configuration.

The stackloader described hereinabove gets its power from the personal computer. An alternate configuration would be a standalone stackloader 204 illustrated in FIG. 12. In this embodiment the stackloader plugs into a housing which includes an optical drive and a floppy drive with its own power source. The autochanger controller is interfaced with a personal computer via the SCSI interface.

Obviously, other embodiments and modifications of the invention will occur to those of ordinary skill in the art in view of the above teachings. Therefore, the invention is to be limited only by the following claims, which include all of such embodiments and modifications when viewed in conjunction with the above specification and accompanying drawings.

We claim:

1. A plugable stackloader having a top and a bottom for transporting media to and from a drive of a computer, the computer having a computer housing, a mother board mounted in the computer housing and a processor mounted on the mother board, the computer housing having a front side with an open slot with the drive mounted in another slot, the stackloader comprising:

a stackloader housing which has front and rear sides the front side having a transport opening;

a plug rigidly fixed to and extending from the front side of the stackloader housing in a vertically spaced relationship with respect to the transport opening;

the plug being receivable by said open slot for positioning the front side of the stackloader housing adjacent the front side of the computer with said transport opening aligned with said another slot when the plug is inserted in said open slot;

a media magazine having a plurality of receptacles for slidably supporting the media, each receptacle having an open end;

the media magazine being mounted in the stackloader housing for vertical movement with open ends of the receptacles being alignable with said transport opening as the magazine moves vertically so that when the plug is inserted in said open slot and when a selected receptacle opening is aligned with the transport opening and said another slot a respective medium can be moved horizontally into or out of the drive contained in said another slot through said selected receptacle opening and through said transport opening;

vertical movement means mounted to the stackloader housing and connected to the magazine for vertically moving the magazine to selected positions for aligning said selected receptacle opening with said drive; and horizontal movement means mounted to the stackloader housing and engagable with a medium which is aligned with the drive for moving the medium into and out of the drive.

2. A system including the plugable stackloader of claim 1, the system comprising:

the computer;

the plug of the stackloader being inserted into the open slot of the computer;

an autochanger controller located in the stackloader housing and electrically connected to the processor of the computer.

3. A plugable stackloader as claimed in claim 1 including:

a plurality of cartridges mounted in the magazine.

4. A plugable stackloader as claimed in claim 1 including:

an autochanger controller mounted in the plug so as to be located in the computer housing when the plug is inserted in said open slot;

each of the vertical motor and the horizontal motor being electrically connected to the autochanger controller; and the autochanger controller being connectable to the mother board of the computer.

5. A plugable stackloader as claimed in claim 4 wherein for each of the vertical and horizontal motors the autochanger controller includes:
   a register for receiving an incremental movement count signal and a direction signal;
   the motor being capable of receiving a direction signal from the register via a direction latch;
   the motor being capable of receiving incremental movement signals from the register via a decremental counter and a pulse generator; and
   the processor being coupled to the decremental counter via a decoder and another register for updating status of the motors.

6. A plugable stackloader as claimed in claim 5 including:
   a plurality of sensors connected to the stackloader housing for sensing horizontal and vertical movements of the magazine and the type of media in a magazine.

7. A plugable stackloader as claimed in claim 6 including:
   said sensors being connectable to the processor via said plug.

8. A plugable stackloader as claimed in claim 1 wherein the medium includes a cartridge which has a pair of spaced apart parallel edges, the edges having a pair of oppositely disposed first and second notches, the stackloader comprising:
   each of the first notches and the second notches of a plurality of cartridges being substantially vertically aligned when mounted in the magazine;
   the rear side of the stackloader housing having an opening;
   a rail pivoted to the stackloader housing for selectively pivoting into and out of the second notches of a plurality of cartridges mounted in the magazine so as to lock and unlock respectively the cartridges in the magazine and being capable of riding in the second notches when the magazine moves vertically; and
   the rail having a cutout which is aligned with the drive when the plug is inserted in said open slot so that when a cartridge is aligned with the drive the cartridge is unlocked for horizontal movement by the detent of the horizontal movement means.

9. A plugable stackloader as claimed in claim 1 wherein the medium includes a cartridge which has a pair of spaced apart parallel edges, the edges having a pair of oppositely disposed first and second notches, the stackloader comprising:
   each of the first notches and the second notches of a plurality of cartridges being substantially vertically aligned when mounted in the magazine;
   the horizontal movement means having a detent which is horizontally aligned with the drive when the plug is inserted in said open slot and is receivable by a first notch of a cartridge for moving the cartridge into and out of the drive; and
   the detent being positioned in the stackloader housing for successively receiving first notches of cartridges mounted in the magazine when the magazine is moved vertically so that when the magazine is moved vertically to a predetermined position a selected cartridge can be moved into or out of the drive.

10. A plugable stackloader as claimed in claim 9 including:
    the magazine having a pair of spaced apart substantially vertical sides;
    one of the sides of the magazine having a plurality of spaced apart horizontal slots, each horizontal slot opening into a respective receptacle;
    each slot being capable of receiving said detent for allowing horizontal movement of the detent to move a cartridge into and out of the drive when the cartridge is in the processing position.

11. A plugable stackloader as claimed in claim 10 including:
    the rear side of the stackloader housing having an opening;
    a rail pivoted to the stackloader housing for selectively pivoting into and out of the second notches of a plurality of cartridges mounted in the magazine so as to lock and unlock respectively the cartridges in the magazine and being capable of riding in the second notches when the magazine moves vertically; and
    the rail having a cutout which is aligned with the drive when the plug is inserted in said open slot so that when a cartridge is aligned with the drive the cartridge is unlocked for horizontal movement by the detent of the horizontal movement means.

12. A plugable stackloader as claimed in claim 1 including:
    a plurality of sensors connected to the stackloader housing for sensing horizontal and vertical movements of the magazine and the type of media in a magazine.

13. A plugable stackloader as claimed in claim 12 including:
    said sensors being connectable to the processor via said plug.

14. A plugable stackloader for transporting media to and from a drive of a computer, the computer having a computer housing, a mother board mounted in the computer housing and a processor mounted on the mother board, the computer housing having a front side with an open slot with the drive mounted in another slot, the stackloader comprising:
    a stackloader housing;
    a plug rigidly fixed to the stackloader housing, the plug being receivable by said open slot, the plug positioning the stackloader housing adjacent the front side of the computer when the plug is inserted in said open slot;
    a media magazine having a plurality of receptacles for slidably supporting the media, each receptacle having an open end;
    the media magazine being mounted in the stackloader housing for vertical movement to a plurality of medium processing positions, each medium processing position aligning a respective medium with the drive so that the medium can be moved horizontally into or out of the drive through the open end of the respective receptacle;
    vertical movement means mounted to the stackloader housing and connected to the magazine for vertically moving the magazine to selected medium processing positions;
    horizontal movement means mounted to the stackloader housing and engagable with a medium which is aligned with the drive for moving the medium into and out of the drive;
    the vertical movement means and the horizontal movement means being electrically connectable to the mother board of the computer via the plug;

the stackloader housing having front and rear sides, the front side of the stackloader housing being adjacent the front side of the computer when the plug is inserted in the open slot and the rear side of the stackloader housing being substantially open;

each of the receptacles of the magazine having another open end which is opposite the first mentioned open end of the receptacle, said another open end allowing an operator to insert and withdraw a cartridge from a respective receptacle; and a tab connected to the stackloader housing and extending at least partially across the open end of the stackloader housing in alignment with the drive to prevent an operator from inserting a cartridge in a receptacle which is aligned with said drive.

15. A plugable stackloader for transporting media to and from a drive of a computer, the computer having a computer housing, a mother board mounted in the computer housing and a processor mounted on the mother board, the computer housing having a front side with an open slot with the drive mounted in another slot, the stackloader comprising:

a stackloader housing;

a plug rigidly fixed to the stackloader housing, the plug being receivable by said open slot, the plug positioning the stackloader housing adjacent the front side of the computer when the plug is inserted in said open slot;

a media magazine having a plurality of receptacles for slidably supporting the media, each receptacle having an open end;

the media magazine being mounted in the stackloader housing for vertical movement to a plurality of medium processing positions, each medium processing position aligning a respective medium with the drive so that the medium can be moved horizontally into or out of the drive through the open end of the respective receptacle;

vertical movement means mounted to the stackloader housing and connected to the magazine for vertically moving the magazine to selected medium processing positions;

horizontal movement means mounted to the stackloader housing and engagable with a medium which is aligned with the drive for moving the medium into and out of the drive;

the vertical movement means and the horizontal movement means being electrically connectable to the mother board of the computer via the plug;

each of the stackloader housing and the plug having first and second substantially vertical sides, the first and second sides of the stackloader housing being coextensive with the first and second sides of the plug respectively;

the second side of the stackloader housing having a vertical slot; and said vertical movement means including:

a shaft connected to the magazine and extending into said vertical slot for vertical movement therein; and a vertical motor connected to the shaft for moving the shaft and magazine vertically to selected media processing positions.

16. A plugable stackloader as claimed in claim 15 wherein the medium includes a cartridge which has a pair of spaced apart parallel edges, the edges having a pair of oppositely disposed first and second notches, the stackloader comprising:

each of the first notches and the second notches of a plurality of cartridges being substantially vertically aligned when mounted in the magazine;

the horizontal movement means having a detent which is horizontally aligned with the drive when the plug is inserted in said open slot and is receivable by a first notch of a cartridge for moving the cartridge into and out of the drive;

the detent being positioned in the stackloader housing for successively receiving first notches of cartridges mounted in the magazine when the magazine is moved vertically so that when the magazine is moved vertically to a predetermined position a selected cartridge can be moved into or out of the drive;

each of the vertical motor and the horizontal motor being electrically connected to the autochanger controller; and the autochanger controller being connectable to the mother board of the computer.

17. A plugable stackloader for transporting media to and from a drive of a computer, the computer having a computer housing, a mother board mounted in the computer housing and a processor mounted on the mother board, the computer housing having a front side with an open slot with the drive mounted in another slot and wherein each medium includes a cartridge which has a pair of spaced apart parallel edges, the edges having a pair of oppositely disposed first and second notches, the stackloader comprising:

a stackloader housing;

a plug rigidly fixed to the stackloader housing, the plug being receivable by said open slot, the plug positioning the stackloader housing adjacent the front side of the computer when the plug is inserted in said open slot;

a media magazine having a plurality of receptacles for slidably supporting the media, each receptacle having an open end;

the media magazine being mounted in the stackloader housing for vertical movement to a plurality of medium processing positions, each medium processing position aligning a respective medium with the drive so that the medium can be moved horizontally into or out of the drive through the open end of the respective receptacle;

vertical movement means mounted to the stackloader housing and connected to the magazine for vertically moving the magazine to selected medium processing positions;

horizontal movement means mounted to the stackloader housing and engagable with a medium which is aligned with the drive for moving the medium into and out of the drive;

the vertical movement means and the horizontal movement means being electrically connectable to the mother board of the computer via the plug;

each of the first notches and the second notches of a plurality of cartridges being substantially vertically aligned when mounted in the magazine;

the horizontal movement means having a detent which is horizontally aligned with the drive when the plug is inserted in said open slot and is receivable by a first notch of a cartridge for moving the cartridge into and out of the drive;

the detent being positioned in the stackloader housing for successively receiving first notches of cartridges mounted in the magazine when the magazine is moved vertically so that when the magazine is moved vertically to a predetermined position a selected cartridge can be moved into or out of the drive;

the magazine having a pair of spaced apart substantially vertical sides;

one of the sides of the magazine having a plurality of spaced apart horizontal slots, each horizontal slot opening into a respective receptacle;

each slot being capable of receiving said detent for allowing horizontal movement of the detent to move a cartridge into and out of the drive when the cartridge is in the processing position;

the stackloader housing having front and rear sides, the front side of the stackloader housing being adjacent the front side of the computer when the plug is inserted in the open slot and the rear side of the stackloader housing being substantially open;

a rail pivoted to the stackloader housing for selectively pivoting into and out of the second notches of a plurality of cartridges mounted in the magazine so as to lock and unlock respectively the cartridges in the magazine and being capable of riding in the second notches when the magazine moves vertically;

the rail having a cutout which is aligned with the drive when the plug is inserted in said open slot so that when a cartridge is aligned with the drive the cartridge is unlocked for horizontal movement by the detent of the horizontal movement means;

each of the stackloader housing and the plug having first and second substantially vertical sides, the first and second sides of the stackloader housing being coextensive with the first and second sides of the plug respectively;

the horizontal movement means including a rack and pinion, said detent being connected to the rack and the pinion being mounted to a horizontal motor which, in turn, is mounted to one of a first side of the stackloader housing and the plug;

the first side of the stackloader housing and the first side of the plug having at least one common slot which extends horizontally; and the rack being slidably mounted in said slot.

18. A plugable stackloader as claimed in claim 17 including:

each of the receptacles of the magazine having another open end which is opposite the first mentioned open end of the receptacle, said another open end allowing an operator to insert and withdraw a cartridge from a respective receptacle; and a tab connected to the stackloader housing and extending at least partially across the open end of the stackloader housing in alignment with the drive to prevent an operator from inserting a cartridge in a receptacle which is aligned with said drive.

19. A plugable stackloader as claimed in claim 18 including:

the rack being substantially L shaped and a combination of the stackloader housing and the plug being substantially L shaped with one leg of the L of the rack having teeth for engaging the pinion and the other leg of the L being connected to said detent; and the L of the rack being located within the L of the combination of the stackloader housing and the plug with respective long and short legs of the Ls being parallel with respect to one another.

20. A plugable stackloader as claimed in claim 19 wherein the vertical movement means includes:

the second side of the stackloader housing having a vertical slot;

a shaft being connected to the magazine and extending into the vertical slot for vertical movement therein;

a vertical motor connected to the shaft for moving the shaft and magazine vertically to selected media processing positions.

21. A plugable stackloader as claimed in claim 20 wherein the vertical movement means includes:

the vertical motor is mounted on the second side of the plug;

a belt and a plurality of pulleys connecting the vertical motor to the shaft, the pulleys being mounted on the second side of the stackloader housing and the belt being fixed to the shaft;

a top and a bottom pulley of the plurality of pulleys substantially aligning the belt with the shaft and an intermediate pulley of the plurality of pulleys and the top pulley returning the belt to the vertical motor.

22. A plugable stackloader as claimed in claim 21 wherein the vertical movement means includes:

the second side of the stackloader housing having a pair of spaced apart vertically extending guide slots;

the magazine having a plurality of pins extending into the guide slots so that the magazine is guided vertically when moved vertically by said vertical motor; and the slot which receives the shaft being located between said pair of guide slots.

23. A plugable stackloader as claimed in claim 22 including:

the magazine having a length which is less than a length of the cartridge so that a rear portion of the cartridge which has the notches projects from a rear end of the magazine.

24. A plugable stackloader as claimed in claim 23 including:

an autochanger controller mounted in the plug;

each of the vertical motor and the horizontal motor being electrically connected to the autochanger controller; and the autochanger controller being connectable to the processor.

25. A plugable stackloader as claimed in claim 24 wherein for each of the vertical and horizontal motors the autochanger controller includes:

a register for receiving an incremental movement count signal and a direction signal;

the motor receiving a direction signal from the register via a direction latch;

the motor receiving incremental movement signals from the register via a decremental counter and a pulse generator; and the processor being connectable to the decremental counter via a decoder and another register for updating status of the motor.

26. A plugable stackloader as claimed in claim 25 including:

sensor means mounted on the stackloader housing and the magazine for sensing a vertical home position and a horizontal home position of the magazine with respect to the stackloader housing and for sensing the type of cartridge for incremental positioning of the cartridge by the vertical and horizontal movement means.

27. A plugable stackloader as claimed in claim 26 including:

said sensors being connectable to the mother board via said other register.

28. A system including the plugable stackloader of claim 27 comprising:

the computer;

the plug of the stackloader being inserted into the open slot of the computer; and the autochanger controller being coupled to the processor.

29. A plugable stackloader as claimed in claim 28 including:

a plurality of cartridges mounted in the magazine.

30. A plugable stackloader having a top and a bottom for transporting media to and from a drive of a computer, the computer having a computer housing, a mother board mounted in the computer housing and a processor mounted on the mother board, the computer housing having a front side with an open slot with the drive mounted in another slot, the stackloader comprising:

a stackloader housing which has front and rear sides, the front side having a transport opening;

a plug rigidly fixed to and extending from the front side of the stackloader housing in a vertically spaced relationship with respect to the transport opening;

the plug being receivable by said open slot for positioning the front side of the stackloader housing adjacent the front side of the computer with said transport opening aligned with said another slot when the plug is inserted in said open slot;

a media magazine having a plurality of receptacles for slidably supporting the media, each receptacle having an open end;

the media magazine being mounted in the stackloader housing for vertical movement with open ends of the receptacles being alignable with said transport opening as the magazine moves vertically so that when the plug is inserted in said open slot and when a selected receptacle opening is aligned with the transport opening and said another slot a respective medium can be moved horizontally into or out of the drive in said another slot through said selected receptacle opening and through said transport opening;

vertical movement means mounted to the stackloader housing and connected to the magazine for vertically moving the magazine to selected positions for aligning said selected receptacle opening with said drive;

horizontal movement means mounted to the stackloader housing and engagable with a medium which is aligned with the drive for moving the medium into and out of the drive;

the rear side of the stackloader housing having an opening;

each of the receptacles of the magazine having another open end which is opposite the first mentioned open end of the receptacle, said another open end allowing an operator to insert and withdraw a cartridge from a respective receptacle; and a tab connected to the stackloader housing and extending at least partially across the opening in the rear side of the stackloader housing in alignment with the drive to prevent an operator from inserting a cartridge in a receptacle which is aligned with said drive.

31. A plugable stackloader having a top and a bottom for transporting media to and from a drive of a computer, the computer having a computer housing, a mother board mounted in the computer housing and a processor mounted on the mother board, the computer housing having a front side with an open slot with the drive mounted in another slot, the stackloader comprising:

a stackloader housing which has front and rear sides, the front side having a transport opening;

a plug rigidly fixed to and extending from the front side of the stackloader housing in a vertically spaced relationship with respect to the transport opening;

the plug being receivable by said open slot and positioning the front side of the stackloader housing adjacent the front side of the computer with said transport opening aligned with said another slot when the plug is inserted in said open slot;

a media magazine having a plurality of receptacles for slidably supporting the media, each receptacle having an open end;

the media magazine being mounted in the stackloader housing for vertical movement with open ends of the receptacles being alignable with said transport opening as the magazine moves vertically so that when the plug is inserted in said open slot and when a selected receptacle opening is aligned with the transport opening and said another slot a respective medium can be moved horizontally into or out of the drive through said selected receptacle opening and through said transport opening;

vertical movement means mounted to the stackloader housing and connected to the magazine for vertically moving the magazine to selected positions for aligning said selected receptacle opening with said drive;

horizontal movement means mounted to the stackloader housing and engagable with a medium which is aligned with the drive for moving the medium into and out of the drive;

each of the stackloader housing and the plug having first and second substantially vertical sides, the first and second sides of the stackloader housing being coextensive with the first and second sides of the plug respectively;

the second side of the stackloader housing having a vertical slot; and said vertical movement means including:

a shaft connected to the magazine and extending into the slot for vertical movement therein; and a vertical motor connected to the shaft for moving the shaft and magazine vertically to selected media processing positions.

32. A plugable stackloader as claimed in claim 31 wherein the medium includes a cartridge which has a pair of spaced apart parallel edges, the edges having a pair of oppositely disposed first and second notches, the stackloader comprising:

each of the first notches and the second notches of a plurality of cartridges being substantially vertically aligned when mounted in the magazine;

the horizontal movement means having a detent which is horizontally aligned with the drive when the plug is inserted in said open slot and is receivable by a first notch of a cartridge for moving the cartridge into and out of the drive; and the detent being positioned in the stackloader housing for successively receiving first notches of cartridges mounted in the magazine when the magazine is moved vertically so that when the magazine is moved vertically to a predetermined position a selected cartridge can be moved into or out of the drive.

33. A plugable stackloader having a top and a bottom for transporting cartridges to and from a drive of a computer, the computer having a computer housing, a mother board mounted in the computer housing and a processor mounted on the mother board, the computer housing having a front side with an open slot with the drive mounted in another slot, the stackloader comprising:

a stackloader housing which has front and rear sides, the front side having a cartridge transport opening;

a plug rigidly fixed to and extending from the front side of the stackloader housing in a vertically spaced relationship with respect to the transport opening;

the plug being receivable by said open slot and positioning the front side of the stackloader housing adjacent the front side of the computer with said transport opening aligned with said another slot when the plug is inserted in said open slot;

a plurality of cartridges, each cartridge having first and second spaced apart notches;

a cartridge magazine having a plurality of receptacles for slidably supporting the cartridges, each receptacle having an open end;

the cartridge magazine being mounted in the stackloader housing for vertical movement with open ends of the receptacles being alignable with said transport opening as the magazine moves vertically so that when the plug is inserted in said open slot and when a selected receptacle opening is aligned with the transport opening and said another slot a selected cartridge in the selected receptacle can be moved horizontally into or out of the drive through said selected receptacle opening and through said transport opening;

vertical movement means mounted to the stackloader housing and connected to the magazine for vertically moving the magazine to selected positions for aligning said selected receptacle opening with said drive;

horizontal movement means mounted to the stackloader housing and engagable with said selected cartridge for moving the selected cartridge into and out of the drive;

each of the first notches and the second notches of said cartridges being substantially vertically aligned when mounted in the magazine;

the horizontal movement means having a detent which is horizontally aligned with the drive when the plug is inserted in said open slot and is receivable by the first notch of said selected cartridge for moving the selected cartridge into and out of the drive;

the detent being positioned in the stackloader housing for successively receiving first notches of the cartridges mounted in the magazine when the magazine is moved vertically so that when the magazine is moved vertically to a predetermined position said selected cartridge can be moved into or out of the drive;

the magazine having a pair of spaced apart substantially vertical sides;

one of the sides of the magazine having a plurality of spaced apart horizontal slots, each horizontal slot opening into a respective receptacle;

each slot being capable of receiving said detent for allowing horizontal movement of the detent to move said selected cartridge into and out of the drive when the selected cartridge is in the processing position;

the rear side of the stackloader housing having an opening;

a rail pivoted to the stackloader housing for selectively pivoting into and out of the second notches of a plurality of cartridges mounted in the magazine so as to lock and unlock respectively the cartridges in the magazine and being capable of riding in the second notches when the magazine moves vertically;

the rail having a cutout which is aligned with the drive when the plug is inserted in said open slot so that when said selected cartridge is aligned with the drive the selected cartridge is unlocked for horizontal movement by the detent of the horizontal movement means;

each of the stackloader housing and the plug having first and second substantially vertical sides, the first and second sides of the stackloader housing being coextensive with the first and second sides of the plug respectively;

the horizontal movement means including a rack and pinion, said detent being connected to the rack and the pinion being mounted to a horizontal motor which, in turn, is mounted to one of a first side of the stackloader housing and the plug;

the first side of the stackloader housing and the first side of the plug having at least one common slot which extends horizontally; and the rack being slidably mounted in said slot.

34. A plugable stackloader as claimed in claim 33 including:

each of the receptacles of the magazine having another open end which is opposite the first mentioned open end of the receptacle, said another open end allowing an operator to insert and withdraw a cartridge from a respective receptacle; and a tab connected to the stackloader housing and extending at least partially across the open end of the stackloader housing in alignment with the drive to prevent an operator from inserting a cartridge in a receptacle which is aligned with said drive.

35. A plugable stackloader as claimed in claim 34 including:

the rack being substantially L shaped and a combination of the stackloader housing and the plug being substantially L shaped with one leg of the L of the rack having teeth for engaging the pinion and the other leg of the L being connected to said detent; and the L of the rack being located within the L of the combination of the stackloader housing and the plug with respective long and short legs of the Ls being parallel with respect to one another.

36. A plugable stackloader as claimed in claim 35 wherein the vertical movement means includes:

the second side of the stackloader housing having a vertical slot;

a shaft being connected to the magazine and extending into the vertical slot for vertical movement therein;

a vertical motor connected to the shaft for moving the shaft and magazine vertically to selected media processing positions.

37. A plugable stackloader as claimed in claim 36 wherein the vertical movement means includes:

the vertical motor is mounted on the second side of the plug;

a belt and a plurality of pulleys connecting the vertical motor to the shaft, the pulleys being mounted on the second side of the stackloader housing and the belt being fixed to the shaft;

a top and a bottom pulley of the plurality of pulleys substantially aligning the belt with the shaft and an intermediate pulley of the plurality of pulleys and the top pulley returning the belt to the vertical motor.

38. A plugable stackloader as claimed in claim 37 wherein the vertical movement means includes:

the second side of the stackloader housing having a pair of spaced apart vertically extending guide slots;

the magazine having a plurality of pins extending into the guide slots so that the magazine is guided vertically when moved vertically by said vertical motor; and the slot which receives the shaft being located between said pair of guide slots.

39. A plugable stackloader as claimed in claim 38 including:

the magazine having a length which is less than a length of the cartridge so that a rear portion of the cartridge which has the notches projects from a rear end of the magazine.

40. A plugable stackloader as claimed in claim 39 including:

an autochanger controller mounted in the plug;

each of the vertical motor and the horizontal motor being electrically connected to the autochanger controller; and the autochanger controller being connectable to the processor.

41. A plugable stackloader as claimed in claim 40 wherein for each of the vertical and horizontal motors the autochanger controller includes:

a register for receiving an incremental movement count signal and a direction signal;

the motor receiving a direction signal from the register via a direction latch;

the motor receiving incremental movement signals from the register via a decremental counter and a pulse generator; and the processor being connectable to the decremental counter via a decoder and another register for updating status of the motor.

42. A plugable stackloader as claimed in claim 41 including:

sensor means mounted on the stackloader housing and the magazine for sensing a vertical home position and a horizontal home position of the magazine with respect to the stackloader housing and for sensing the type of cartridge for incremental positioning of the cartridge by the vertical and horizontal movement means.

43. A plugable stackloader as claimed in claim 42 including:

said sensors being connectable to the mother board via said other register.

44. A system including the plugable stackloader of claim 43 comprising:

the computer;

the plug of the stackloader being inserted into the open slot of the computer; and the autochanger controller being coupled to the processor.

45. A plugable stackloader as claimed in claim 44 including:

a plurality of said cartridges mounted in the magazine.

46. A plugable stackloader for transporting cartridges to and from a drive of a computer, the computer having a computer housing, a mother board and a processor mounted on the mother board, the computer housing having first and second slots, the first slot being an open slot and the second slot being a drive slot which contains a drive for processing a cartridge, the stackloader comprising:

a stackloader housing having a top and a bottom which are interconnected by front and rear sides and first and second lateral sides for forming a stackloader chamber, the stackloader chamber having a top chamber portion and a bottom chamber portion and each of the front and rear sides of the stackloader housing having an opening;

a plug housing having a top and a bottom which are interconnected by front and rear sides and first and second lateral sides for forming a plug chamber, the rear side of the plug housing being open;

the plug housing being rigidly connected to the stackloader housing and extending forwardly thereof so that the stackloader housing and the plug housing form an inverted "L" shape;

the opening in the front side of the stackloader housing facing the opening in the rear side of the plug housing with the stackloader top chamber portion being in communication with the plug chamber so as to form a horizontal chamber which extends substantially from the rear side of the stackloader housing to the front side of the plug housing;

said opening in the front side of the stackloader housing providing the stackloader bottom chamber portion with a cartridge transport opening which is located below said bottom side of the plug housing;

the plug housing being receivable by said open slot for positioning the transport opening in horizontal alignment with said drive slot;

a cartridge magazine having front and rear sides, first and second lateral sides and a plurality of receptacles, each receptacle having a front opening at said front side and being capable of horizontally supporting said cartridge for slidable movement in and out of said front opening;

vertical movement means mounting the cartridge magazine in the stackloader bottom chamber portion for vertically moving the cartridge magazine to align any one of the front open ends of the receptacles with said transport opening; and horizontal movement means located in each of the plug chamber and the stackloader top, chamber portion for engaging said cartridge and moving the cartridge into and out of said receptacle when the cartridge is horizontally aligned with the transport opening by a respective receptacle so as to move said cartridge through said transport opening into or out of said drive located in said second slot.

47. A plugable stackloader as claimed in claim 46 including:

a plurality of said cartridges;

each cartridge having a pair of spaced apart parallel edges, the edges having a pair of oppositely disposed first and second notches;

the cartridges being mounted in the magazine with each of their first and second notches vertically aligned;

the rear side of the stackloader housing having an opening;

a rail pivoted to the stackloader housing for selectively pivoting into and out of the second notches of the cartridges so as to lock and unlock respectively the cartridges in the magazine and being capable of riding in the second notches when the magazine moves vertically; and the rail having a cutout which is aligned with the drive when the plug housing is inserted in said open slot so that when said cartridge is aligned with the drive the cartridge is unlocked for horizontal movement.

48. A stackloader as claimed in claim 47 including:

each receptacle having a rear opening at the rear side of the magazine and the stackloader housing having a rear opening horizontally aligned with said transport opening so that the rear openings permit the cartridge to be inserted and withdrawn from a receptacle which is horizontally aligned with said transport opening; and a tab connected to the rail and movable between first and second positions, the first position blocking said rear openings to said cartridge when the rail is in its first position and the second position clearing the rear openings to said cartridge when the rail is in said second position.

49. A plugable stackloader as claimed in claim 46 including:

an autochanger controller mounted in the plug so as to be located in the computer when the plug is inserted in said open slot;

each of the vertical motor and the horizontal motor being electrically connected to the autochanger controller; and the autochanger controller being connectable to the mother board of the computer.

50. A plugable stackloader as claimed in claim 49 wherein for each of the horizontal and vertical movement means the autochanger controller includes:

a register for receiving an incremental movement count signal and a direction signal;

the movement means being capable of receiving a direction signal from the register via a direction latch;

the movement means being capable of receiving incremental movement signals from the register via a decremental counter and a pulse generator; and the processor being coupled to the decremental counter via a decoder and another register for updating status of the movement means.

51. A plugable stackloader as claimed in claim 46 including:

a plurality of sensors connected to the stackloader housing for sensing horizontal and vertical movements of the magazine and the type of cartridge in a magazine.

52. A plugable stackloader as claimed in claim 51 including:

said sensors being connectable to the processor via said plug.

53. A plugable stackloader as claimed in claim 52 including:

said sensors being connectable to the mother board via said other register.

54. A stackloader as claimed in claim 46 wherein each cartridge has a pair of spaced apart parallel edges, the edges having oppositely disposed first and second notches, the stackloader comprising:

said horizontal movement means having a detent capable of insertion in said first notch of a cartridge which is horizontally aligned with said transport opening for reciprocably moving the cartridge in and out of the transport opening; and each receptacle having a horizontal slot at said first lateral side of the cartridge magazine for receiving said detent and allowing horizontal movement of the detent within the slot when the slot is horizontally aligned with said transport opening.

55. A plugable stackloader as claimed in claim 54 comprising:

a plurality of said cartridges;

the cartridges being mounted in the magazine with each of their first and second notches vertically aligned;

the rear side of the stackloader housing having an opening;

a rail pivoted to the stackloader housing for selectively pivoting into and out of the second notches of the cartridges so as to lock and unlock respectively the cartridges in the magazine and being capable of riding in the second notches when the magazine moves vertically; and the rail having a cutout which is aligned with the drive when the plug housing is inserted in said open slot so that when said cartridge is aligned with the drive the cartridge is unlocked for horizontal movement.

56. A stackloader as claimed in claim 55 including:

each receptacle having a rear opening at the rear side of the magazine and the stackloader housing having a rear opening horizontally aligned with said transport opening so that the rear openings permit the cartridge to be inserted and withdrawn from a receptacle which is horizontally aligned with said transport opening; and a tab connected to the rail and movable between first and second positions, the first position blocking said rear openings to said cartridge when the rail is in its first position and the second position clearing the rear openings to said cartridge when the rail is in said second position.

57. A plugable stackloader as claimed in claim 56 including:

an autochanger controller mounted in the plug so as to be located in the computer when the plug is inserted in said open slot;

each of the vertical motor and the horizontal motor being electrically connected to the autochanger controller; and the autochanger controller being connectable to the mother board of the computer.

58. A plugable stackloader as claimed in claim 57 wherein for each of the horizontal and vertical movement means the autochanger controller includes:

a register for receiving an incremental movement count signal and a direction signal;

the movement means being capable of receiving a direction signal from the register via a direction latch;

the movement means being capable of receiving incremental movement signals from the register via a decremental counter and a pulse generator; and the processor being coupled to the decremental counter via a decoder and another register for updating status of the movement means.

59. A plugable stackloader as claimed in claim 58 including:

a plurality of sensors connected to the stackloader housing for sensing horizontal and vertical movements of the magazine and the type of cartridge in a magazine.

60. A plugable stackloader as claimed in claim 59 including:

said sensors being connectable to the processor via said plug.

61. A plugable stackloader as claimed in claim 60 including:

said sensors being connectable to the mother board via said other register.

62. A stackloader as claimed in claim 46 including:

the computer;

the plug housing being inserted in said open slot; and an autochanger controller located in the horizontal chamber and electrically connected to the processor.

63. A stackloader as claimed in claim 62 wherein a plurality of cartridges are mounted in said cartridge magazine.

64. A plugable stackloader as claimed in claim 63 including:

each cartridge having a pair of spaced apart parallel edges, the edges having a pair of oppositely disposed first and second notches;

each of the first notches and the second notches of a plurality of cartridges being substantially vertically aligned in the magazine;

the horizontal movement means having a detent which is horizontally aligned with the drive and receivable by the first notch of the cartridge for moving the cartridge into and out of the drive; and the detent being positioned in the stackloader housing for successively receiving first notches of cartridges mounted in the magazine when the magazine is moved vertically so that when the magazine is moved vertically to a predetermined position a selected cartridge can be moved into or out of the drive.

65. A plugable stackloader as claimed in claim 64 including:

one of the lateral sides of the magazine having a plurality of spaced apart horizontal slots, each horizontal slot opening into a respective receptacle;

each slot being capable of receiving said detent for allowing horizontal movement of the detent to move a cartridge into and out of the drive when the cartridge is aligned with said drive slot.

66. A plugable stackloader as claimed in claim 65 including:

a rail pivoted to the stackloader housing for selectively pivoting into and out of the second notches of the cartridges mounted in the magazine so as to lock and unlock respectively the cartridges in the magazine and being capable of riding in the second notches when the magazine moves vertically; and the rail having a cutout which is aligned with the drive slot so that when said cartridge is aligned with the drive slot the cartridge is unlocked for horizontal movement by the detent.

67. A stackloader as claimed in claim 66 including:

each receptacle having a rear opening at the rear side of the cartridge magazine and the stackloader housing having a rear opening horizontally aligned with said transport opening so that the rear openings permit the cartridge to be inserted and withdrawn from a receptacle which is horizontally aligned with said transport opening; and a tab connected to the rail and movable between first and second positions, the first position blocking said rear openings to said cartridge when the rail is in its first position and the second position clearing the rear openings to said cartridge when the rail is in said second position.

68. A plugable stackloader as claimed in claim 67 including:

an autochanger controller mounted in the plug so as to be located in the computer when the plug is inserted in said open slot;

each of the horizontal and vertical movement means being electrically connected to the autochanger controller; and the autochanger controller being connectable to the mother board of the computer.

69. A plugable stackloader as claimed in claim 68 wherein for each of the horizontal and vertical movement means the autochanger controller includes:

a register for receiving an incremental movement count signal and a direction signal;

the movement means being capable of receiving a direction signal from the register via a direction latch;

the movement means being capable of receiving incremental movement signals from the register via a decremental counter and a pulse generator; and the processor being coupled to the decremental counter via a decoder and another register for updating status of the movement means.

70. A plugable stackloader as claimed in claim 69 including:

a plurality of sensors connected to the stackloader housing for sensing horizontal and vertical movements of the magazine and the type of cartridge in a magazine.

71. A plugable stackloader as claimed in claim 70 including:

said sensors being connected to the processor via said plug.

72. A plugable stackloader as claimed in claim 71 including:

said sensors being connected to the mother board via said other register.

* * * * *